Sept. 22, 1953   O. E. ANDRUS   2,653,211
METHOD OF MANUFACTURING PLATED ARTICLES
Filed July 5, 1951
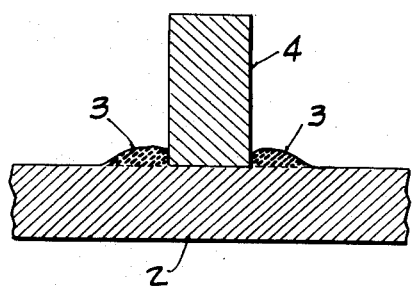
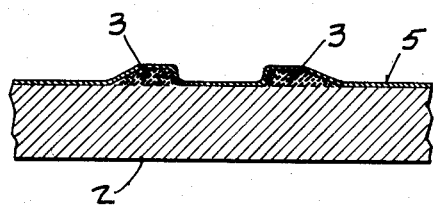
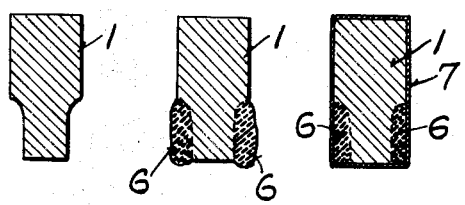
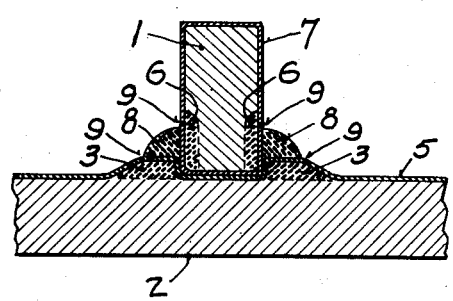
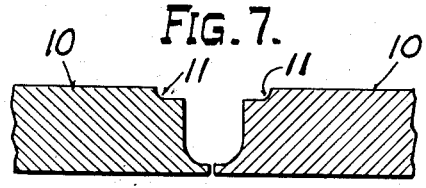
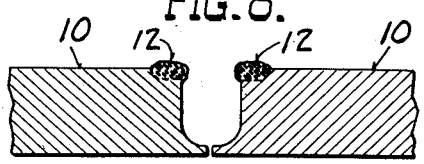
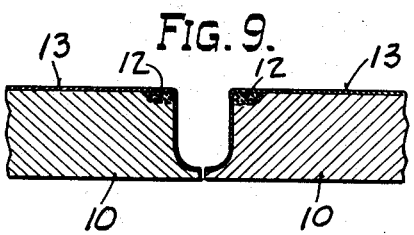
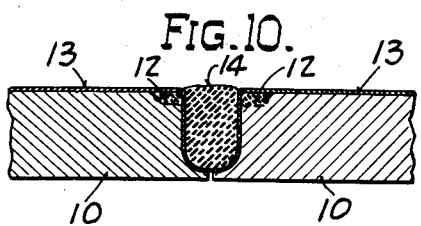
INVENTOR.
Orrin E. Andrus
BY
Andrus & Scales
ATTORNEYS.

Patented Sept. 22, 1953

2,653,211

UNITED STATES PATENT OFFICE 2,653,211

METHOD OF MANUFACTURING PLATED ARTICLES

Orrin E. Andrus, Milwaukee, Wis., assignor to A. O. Smith Corporation, Milwaukee, Wis., a corporation of New York Application July 5, 1951, Serial No. 235,170

8 Claims. (Cl. 219—10)

This invention relates to a method of manufacturing plated articles, and particularly to the fabrication of corrosion-resistant vessels by welding together a plurality of plated base members.

The object of the invention is to provide a plated vessel wherein any cracks which occur in the plating metal adjacent the fusion welds which unite the plated base members are rendered inoperative to produce corrosion of the base metal and consequent contamination of the fluid contained within the vessel.

In general, the method comprises providing a layer of corrosion-resistant metal on a ferrous metal base member in the proposed welding area and then plating the base member in such a manner that at least one edge of the corrosion-resistant layer is overlapped. Thereafter, a fusion weld is made between the corrosion-resistant layer and a second member, with the edge of the weld being spaced from the overlapped edge of the corrosion-resistant layer to insure that any cracks occurring in the plating metal as a result of the welding operation are located over corrosion-resistant metal instead of base metal.

Other objects and advantages of the invention will be set forth more fully in the following description of embodiments of the invention illustrated in the accompanying drawings.

In the drawings:

Figure 1 is a cross-sectional view illustrating the deposition of corrosion-resistant metal onto a carbon steel base plate preparatory to welding a reinforcing ring thereto;

Fig. 2 corresponds to Fig. 1 and shows the base plate and corrosion-resistant metal after the plating thereof;

Fig. 3 is a cross-sectional view of a carbon steel reinforcing ring after the edges thereof have been grooved;

Fig. 4 shows the grooves of Fig. 3 as filled with corrosion-resistant metal;

Fig. 5 illustrates the member of Fig. 4 after the machining of the corrosion-resistant inlays to dimensions and the subsequent plating of the inlays and base metal;

Fig. 6 shows the completed joint, with the ring of Fig. 5 welded to the prepared plate of Fig. 2;

Fig. 7 is a cross-sectional view of two plates grooved for butt welding according to another embodiment of the invention;

Fig. 8 shows the upper grooves of Fig. 7 as filled with corrosion-resistant metal;

Fig. 9 illustrates the members of Fig. 8 after the machining and plating thereof; and Fig. 10 shows a joint resulting from the welding of the plates prepared according to Fig. 9.

Referring to Figs. 1-6 of the drawings, the invention is illustrated as employed in the fillet welding of a ferrous metal reinforcing ring 1 to a ferrous metal plate 2, both of said members being suitably shaped to form part of a vessel which it is desired to protect against corrosion as will be described. Since the ring 1 is to be on the interior of the vessel, it is essential that the joint between the ring and the plate 2 be resistant both to the direct corrosive effect of the particular fluid to be contained within the vessel and to galvanic corrosion resulting from the combined action of the metals used and any contained liquid.

According to the invention, the first step of the method consists of providing a layer 3 of corrosion-resistant metal on the surface of the base plate 2 in the region of each proposed weld between the plate and ring 1. This may be accomplished, as shown in Fig. 1, by positioning a chill bar 4 of substantially the same width as the ring 1 on the base plate, and then depositing a layer 3 adjacent each side of the chill bar by electric arc fusion.

The chill bar 4 is then removed and the interior surface of the member 2 is plated with a suitable corrosion-resistant metal coating 5. It is essential that the plating metal 5 overlap the outer edge of each layer 3, that is to say that the plating metal extend over the outer boundaries between the base metal and the layers 3 to protect the base metal at said boundaries from corrosion. The plating metal is preferably deposited by the electrolytic process, making it convenient to the plating metal over the entire exposed surfaces of the layers 3 and base plate as illustrated in Fig. 2. However, a suitable stop-off material may be employed, if desired, to prevent deposition of the plating metal in places where it is not needed.

In order to prepare the reinforcing ring 1 for welding, the outer edges thereof are caused to be recessed or grooved (Fig. 3) and the grooves are filled with corrosion-resistant inlays 6 as shown in Fig. 4. The inlays 6, which are preferably deposited by electric arc fusion as in the case of the layers 3, may next be machined, for example to make the surfaces thereof flush with the surfaces of the base metal of the reinforcing ring. The ring is then plated with corrosion-resistant metal 7 (Fig. 5) in such a manner that the upper edges of the inlays are overlapped by the plating metal, for instance by completely covering the base metal and inlays through electrolytic deposition of the plating metal.

Referring to Fig. 6, the ring of Fig. 5 is next fusion welded to the prepared base plate of Fig. 2 to complete the corrosion-resistant joint. This is accomplished by positioning the inlaid and plated edges of the ring 1 between the plated layers 3 and making corrosion-resistant arc welds 8 therebetween.

Due to the fact that the heat generated during the making of welds 8 frequently causes the respective plating coatings 5 and 7 to crack adjacent the welds as shown at 9 in Fig. 6, it is important that the welds 8 be spaced from the outer overlapped edges of layers 3 and the upper overlapped edges of the inlays 6. Any cracks which occur will accordingly be located over corrosion-resistant metal instead of over base metal and the joint will be free from corrosion and contamination.

Instead of depositing the layers 3 on the flat surface of base plate 2 as described, the base plate may be grooved and filled with a corrosion-resistant inlay as in the case of the reinforcing ring 1 and the inlay may be machined flush if desired. Similarly, the reinforcing ring need not be grooved since the corrosion-resistant metal 6 may be deposited on the ungrooved corners of the ring.

In addition, it is within the scope of the invention to apply corrosion-resistant metal to the entire inner face of the ring prior to plating or to use a ring which is composed entirely of corrosion-resistant metal, the plating operation being unnecessary in the latter instance.

With regard to the metals employed under the invention, the base plate 2 and ring 1 are normally carbon steel and the coatings 5 and 7 are preferably nickel. Where the coatings 5 and 7 are nickel, the layers 3 and 6 are preferably either nickel or stainless steel as is the filler metal used in making the welds 8.

It is essential that the weld filler metal, the coatings 5 and 7, and the layers 3 and 6 have similar corrosion-resistance characteristics adapted to protect the vessel against the action of the fluid contained therein. It is also necessary that the metals be compatible with each other for the particular fluid to be contained, so that no harmful electric currents will be set up within the vessel to cause galvanic corrosion.

Referring to Figs. 7–10, a use of the invention in the butt welding of two ferrous metal plates 10 is illustrated. Where, for example, the edges of the plates 10 are shaped for a single-U groove weld, the upper portions of the edges are first grooved out as at 11 in Fig. 7.

Thereafter, the recesses 11 are filled with corrosion-resistant metal inlays 12 and any excess inlay metal is preferably removed to make the inlays flush with the base plate surfaces as illustrated in Fig. 9. The faces of the plates 10 are then plated, for example by electrolytic deposition, with a corrosion-resistant coating 13 (Fig. 9) which overlaps the inlays 12.

A corrosion-resistant groove weld 14 is next made to unite the plates, with the weld being spaced a substantial distance from the outer overlapped edges of the inlays. In accordance with usual arc welding practice the back side of the weld may be chipped out and re-welded with either carbon steel or corrosion-resistant filler metal.

The metals employed in the butt welding of plates 10 are the same as were mentioned in connection with Figs. 1–6. The same modified practices may also be used if desired, for instance the entire ends of plates 10 may be inlaid prior to welding instead of merely inlaying the upper corners thereof.

The method of the invention has proved to be particularly important in the fabrication of large plated vessels where it is not feasible to plate an entire vessel interior after all welds have been made. With the invention, the corrosion-resistance properties of such large fabricated vessels are at least as good as those of articles wherein plating is the final step in the manufacturing process.

Various embodiments of the invention may be employed within the scope of the following claims.

I claim:

1. In a method of fabricating a plated article, the steps of providing a layer of corrosion-resistant metal on a ferrous metal base member in the region of a proposed joint between the ferrous metal base member and a second member, thereafter plating the base member with corrosion-resistant plating metal, said plating metal overlapping said corrosion-resistant layer, and then making a corrosion-resistant weld between the corrosion-resistant layer and said second member, the edge of the weld being spaced from the edges of the corrosion-resistant layer adjoining said base member, with any cracks occurring in said plating metal adjacent said weld tending to expose said corrosion-resistant layer to corrosion rather than the base member.

2. In a method of fabricating a plated vessel, the steps of fusion depositing layers of corrosion-resistant metal on two carbon steel base members in the region of a proposed joint between said base members, thereafter plating the base members and the fusion deposited layers with metal having corrosion-resistance characteristics similar to those of said fusion deposited layers, and then making a corrosion-resistant fusion weld between said plated fusion deposited layers, said fusion weld being spaced from edges of said fusion deposited layers adjoining said base member overlapped by said plating metal, with any cracks occurring in said plating metal adjacent said weld tending to expose said fusion deposited layers to corrosion and thereby prevent exposure of said carbon steel base member to corrosion.

3. A method of fabricating a nickel plated vessel, which comprises the steps of depositing through electric arc fusion a layer of corrosion-resistant metal on the surface of each of two carbon steel base members in the region of a proposed joint therebetween, thereafter electrolytically depositing nickel on the base members and on each fusion deposited layer, and then making a corrosion-resistant arc weld between said plated fusion deposited layers and spaced from an edge of each layer adjoining said base member and overlapped by the nickel, said metal of the fusion deposited layers and the filler metal for said arc weld being compatible with each other and with nickel to prevent galvanic corrosion in the completed vessel.

4. In a method of fabricating a plated article, the steps of providing a layer of metal of substantial thickness on a ferrous metal base member in the region of a proposed joint between said base member and a second member, thereafter plating the base member with plating metal, the latter being lapped over an edge of said layer adjoining the metal of said base member, and then making an arc weld between said layer and said second member and spaced from said edge of the layer adjoining the base metal, said plating metal, said layer metal, and the filler metal for said arc weld being corrosion-resistant.

5. In a method of fabricating a plated vessel, the steps of depositing by electric arc fusion a layer of metal on each of two carbon steel base members in the region of a proposed joint therebetween, thereafter electrolytically depositing a coating of nickel on the base members and the fusion deposited layers, and then making an arc weld between said plated fusion deposited layers and spaced from an edge of each layer adjoining said base member overlapped by the nickel, the metal of said layers and the filler metal for said arc weld being corrosion-resistant.

6. A method of fabricating a plated vessel, which comprises the steps of providing a recess in a ferrous metal base member in the region of a proposed joint between said base member and a second member, fusion depositing an inlay of corrosion-resistant metal in said recess, plating the base member with metal having corrosion-resistance characteristics similar to those of said inlay, said plating metal overlapping an edge of said inlay adjoining said base member, and then making a corrosion-resistant fusion weld between the inlay and said second member, the edge of the fusion weld being spaced from said overlapped edge of the inlay to prevent cracking of the plating metal over said base member and consequent exposure of base metal to corrosion.

7. A method of fabricating a plated vessel, which comprises the steps of forming a groove in a ferrous metal base member in the region of a proposed joint between said base member and a second member, fusion depositing an inlay of metal in said groove, plating the base member with nickel and overlapping an edge of said inlay therewith, and then making an arc weld between the inlay and said second member and spaced from said edge of the inlay adjoining said base member overlapped by the nickel, the metal of said inlay and the filler metal for said arc weld being corrosion-resistant.

8. A method of fabricating a plated vessel, which comprises the steps of forming a groove in a carbon steel base member in the region of a proposed joint between said base member and a second member, depositing by electric arc fusion an inlay of metal in said groove to at least fill the same, removing excess inlay metal to make the surface of the inlay flush with the surface of the base member, electrolytically depositing a coating of nickel on said base member and said inlay, and then making an arc weld between said plated inlay and said second member and spaced from an edge of the inlay adjoining the metal of said base member, said inlay metal and the filler metal for said arc weld being corrosion-resistant.

ORRIN E. ANDRUS.

References Cited in the file of this patent

UNITED STATES PATENTS

| Number | Name | Date |
|---|---|---|
| 1,285,875 | Woodbury | Nov. 28, 1918 |
| 2,060,765 | Welch | Nov. 10, 1936 |
| 2,133,058 | Paine | Oct. 11, 1938 |
| 2,233,455 | Larson | Mar. 4, 1941 |
| 2,416,379 | Cohn | Feb. 25, 1947 |

FOREIGN PATENTS

| Number | Country | Date |
|---|---|---|
| 548,992 | Great Britain | Nov. 2, 1942 |
| 663,132 | Germany | July 29, 1938 |